(12) United States Patent
Bazylinski

(10) Patent No.: US 9,085,955 B2
(45) Date of Patent: Jul. 21, 2015

(54) ANTI-ROTATION DEVICE FOR WELLAHEAD STUFFING BOX

(76) Inventor: Duane Bazylinski, Major (CA)

( * ) Notice: Subject to any disclaimer, the term of this patent is extended or adjusted under 35 U.S.C. 154(b) by 581 days.

(21) Appl. No.: 13/415,516

(22) Filed: Mar. 8, 2012

(65) Prior Publication Data

US 2013/0039695 A1 Feb. 14, 2013
US 2013/0189026 A2 Jul. 25, 2013

(30) Foreign Application Priority Data

Aug. 9, 2011 (CA) .................................... 2748207

(51) Int. Cl.
*E21B 33/08* (2006.01)
(52) U.S. Cl.
CPC ............ *E21B 33/08* (2013.01); *Y10T 403/581* (2015.01)
(58) Field of Classification Search
CPC ................................ E21B 33/03; E21B 33/08

USPC ........... 166/84.1, 79.1, 75.13, 96.1; 215/330, 215/331; 220/825, 956, 810
See application file for complete search history.

(56) References Cited

U.S. PATENT DOCUMENTS 6,076,689 A * 6/2000 Vassallo ........................ 215/209

* cited by examiner

*Primary Examiner* — David Andrews
*Assistant Examiner* — Kristyn Hall
(74) *Attorney, Agent, or Firm* — Craig J. Lervick; Larkin Hoffman Daly & Lindgren, Ltd.

(57) ABSTRACT

A device for preventing rotation of a stuffing box cap to avoid leakage of contents, the device comprising an upwardly projecting stop member mounted on the stuffing box body which is configured to abut a protuberance on the cap and thereby prevent cap rotation. The stop member is preferably configured to pivot away from the stuffing box cap when cap removal is desired.

13 Claims, 6 Drawing Sheets

FIG. 1a

ANTI-ROTATION DEVICE FOR WELLAHEAD STUFFING BOX

FIELD OF THE INVENTION

The invention relates to stuffing boxes and methods for maintaining seal integrity.

BACKGROUND OF THE INVENTION

Stuffing boxes are commonly used on oil and gas wellheads around a reciprocating or rotating shaft for sealing and preventing fluid/gas leakage into the environment. The shaft passes out of the well tubing and into the aboveground environment, and hence some form of sealing is required to prevent fluid loss and site contamination. Stuffing boxes are usually the final piece of equipment that is threaded onto the well tubing, with the shaft passing through the stuffing box and cap, creating a seal around the shaft as it moves in a vertical or rotational direction and thereby ensuring that the well fluids flow to the desired output rather than spill into the environment. The desired seal is created by the stuffing box, which contains packing material that is under pressure and in contact with the shaft and the inner stuffing box walls. The seal is only created where there is sufficient pressure on the packing, and this pressure is achieved by threading a cap onto the stuffing box housing, the cap being provided with an opening to allow for passage of the shaft. When sufficient pressure is applied to the packing by means of the cap, a tight seal is achieved and fluid leakage is avoided.

Stuffing boxes can leak despite proper tightening of the cap if there is packing material wear, which reduces the desired friction within the stuffing box that is required to counter the pressure of the downhole fluid. This is normal, expected wear, and it is usually addressed by retightening of the cap or replacement of the packing material. It has been found, however, that caps can also sometimes back off and loosen due to the significant pressures within a stuffing box, which can result in fluid leakage at the well site. Such leakage can contaminate the adjacent land, surface water and subsurface water, and the leaked fluid can have very high salt content that is harmful to plants in the area. Also, leaked gas can be poisonous and even fatal in high enough concentrations. There can be significant leakage depending on the pressure in the well bore, and substantial remediation costs can be incurred in subsequent attempts to address the spill.

Despite this substantial risk, there is presently no device on the market that can be used by the industry to prevent the stuffing box cap from backing off and causing leakage. The standard practice is simply manual observation, which may not be adequate where a large number of wells must be monitored. The only means currently employed in the oil and gas industry to ensure a proper seal at surface is to tighten and retighten the stuffing box cap and hope that the friction is sufficient to maintain the seal and prevent the cap from backing off. As stated above, however, the friction reduces with packing wear and the pressure on the cap decreases, thereby enhancing the risk of the cap backing off.

SUMMARY OF THE INVENTION

The present invention therefore seeks to provide a device that can be applied to a standard stuffing box to help avoid or prevent leakage caused by the cap backing off. The present invention also seeks to provide such a device that is of simple and inexpensive construction, and that is reliable and easy to install and maintain.

According to a first aspect of the present invention there is provided an anti-rotation device for a stuffing box, the stuffing box comprising a housing with a threaded opening and a correspondingly threaded cap configured to seal the opening, the cap rotatable in a first direction to seal the opening and in an opposite second direction to unseal the opening, the cap being provided with a protuberance on an outside edge thereof, the anti-rotation device comprising a stop member attached to the outside of the housing and extending at least adjacent the cap, such that upon rotation of the cap in the second direction the protuberance contacts the stop member and the cap is thereby prevented from further rotation in the second direction.

According to a second aspect of the present invention there is provided an anti-rotation device for use with a stuffing box, the stuffing box comprising a housing with a threaded opening and a correspondingly threaded cap configured to seal the opening, the cap rotatable in a first direction to seal the opening and in an opposite second direction to unseal the opening, the cap being provided with a protuberance on an outside edge thereof, the anti-rotation device comprising a stop member for attachment to the outside of the housing and for extending at least adjacent the cap, such that upon rotation of the cap in the second direction the protuberance contacts the stop member and the cap is thereby prevented from further rotation in the second direction.

According to a third aspect of the present invention there is provided an anti-rotation device for use with a stuffing box, the stuffing box comprising a housing with a threaded opening and a correspondingly threaded cap configured to seal the opening, the cap rotatable in a first direction to seal the opening and in an opposite second direction to unseal the opening, the anti-rotation device comprising:

a protuberance for mounting on an outside edge of the cap; and a stop member for attachment to the outside of the housing and for extending at least adjacent the cap, such that upon rotation of the cap in the second direction the protuberance contacts the stop member and the cap is thereby prevented from further rotation in the second direction.

In exemplary embodiments of the present invention, the protuberance is of unitary construction with the cap, but it can also be a discrete device mounted on the cap to provide the necessary extension to contact the stop member.

The stop member may be either permanently mounted or removably attached to the housing. In a preferred embodiment, the stop member is attached to the housing by means of a bracket; in this case the bracket may be either permanently mounted or removably attached to the housing, and the stop member may be removably attached to the bracket.

In other preferred embodiments, the stop member is attached to the housing by pivotable mounting means, which pivotable mounting means can be part of the stop member or of the bracket where a bracket is used, such that the stop member may be pivoted away from the cap and out of contact with the protuberance, to enable removal of the cap when desired. Most preferably, the pivotable mounting means are provided with a disengageable locking mechanism to prevent pivoting of the stop member away from the cap when it is desired that the cap remain in place.

The present invention accordingly provides a simple device that is relatively easy to install on a standard stuffing box and retains the stuffing box cap in a tightened position, while being of inexpensive construction.

A detailed description of exemplary embodiments of the present invention is given in the following. It is to be understood, however, that the invention is not to be construed as being limited to these embodiments.

BRIEF DESCRIPTION OF THE DRAWINGS

In the accompanying drawings, which illustrate exemplary embodiments of the present invention:

FIG. 1a is an elevation view of an embodiment of an anti-rotation device in accordance with the present invention;

FIG. 1b is a top plan view of the embodiment of FIG. 1a;

FIG. 2a is a side elevation view of the stop member of the embodiment of FIG. 1a;

FIG. 2b is a front elevation view of the stop member of the embodiment of FIG. 1a;

FIG. 3a is a top plan view of a stuffing box fitted with the embodiment of FIG. 1a;

FIG. 3b is an elevation view of the stuffing box of FIG. 3a;

FIG. 4b is a top plan view of a stuffing box cap provided with the bolt-on protuberance of FIG. 4a.

Preferred embodiments of the present invention will now be described with reference to the accompanying drawings.

DETAILED DESCRIPTION OF EXEMPLARY EMBODIMENTS

Referring now in detail to the accompanying drawings, two exemplary embodiments of the present invention are illustrated, one for use with a stuffing box cap having protuberances or lugs, and one for use with a stuffing box cap without protuberances or lugs.

Figure 1A:
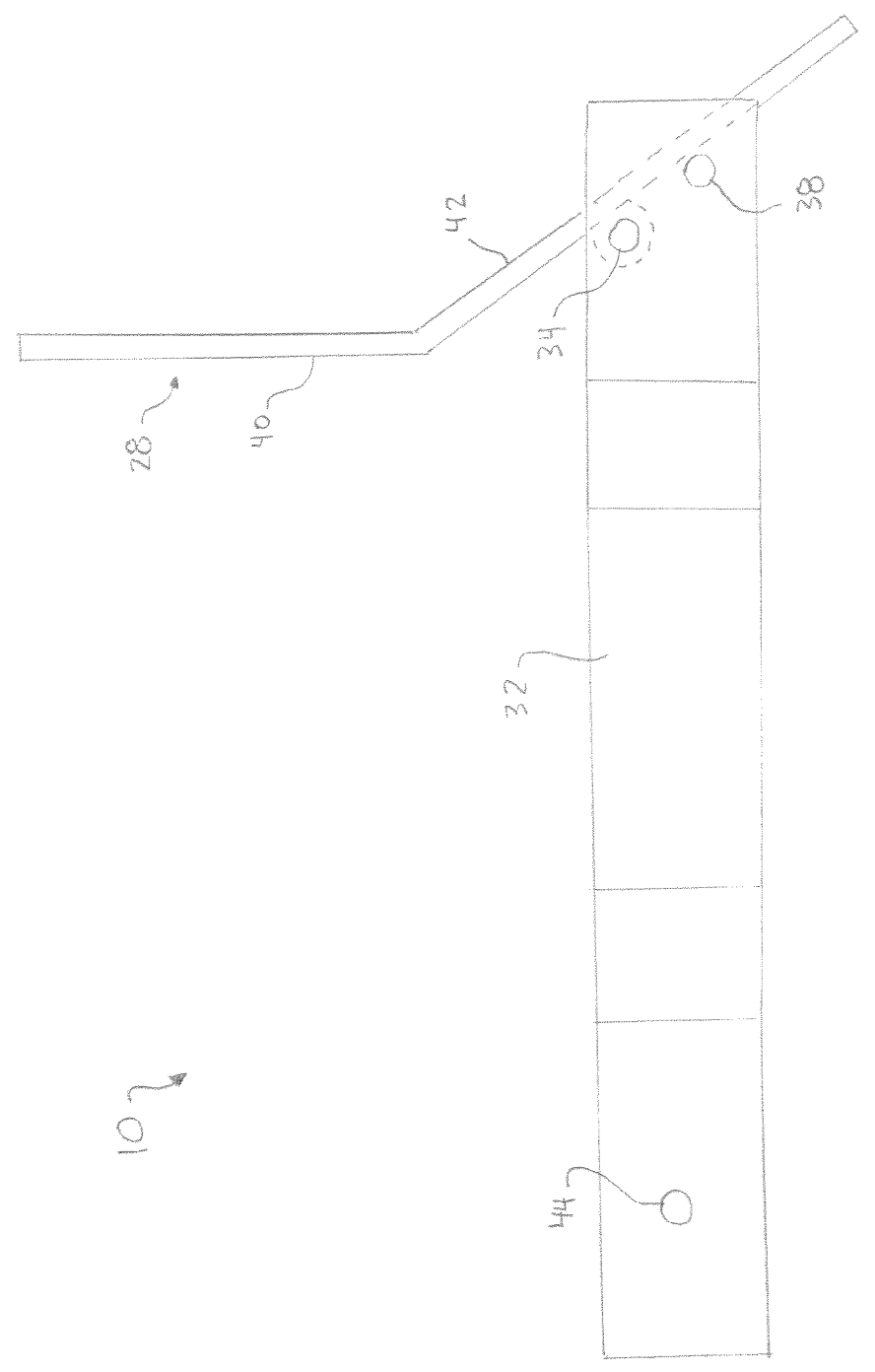
Figure 1B:
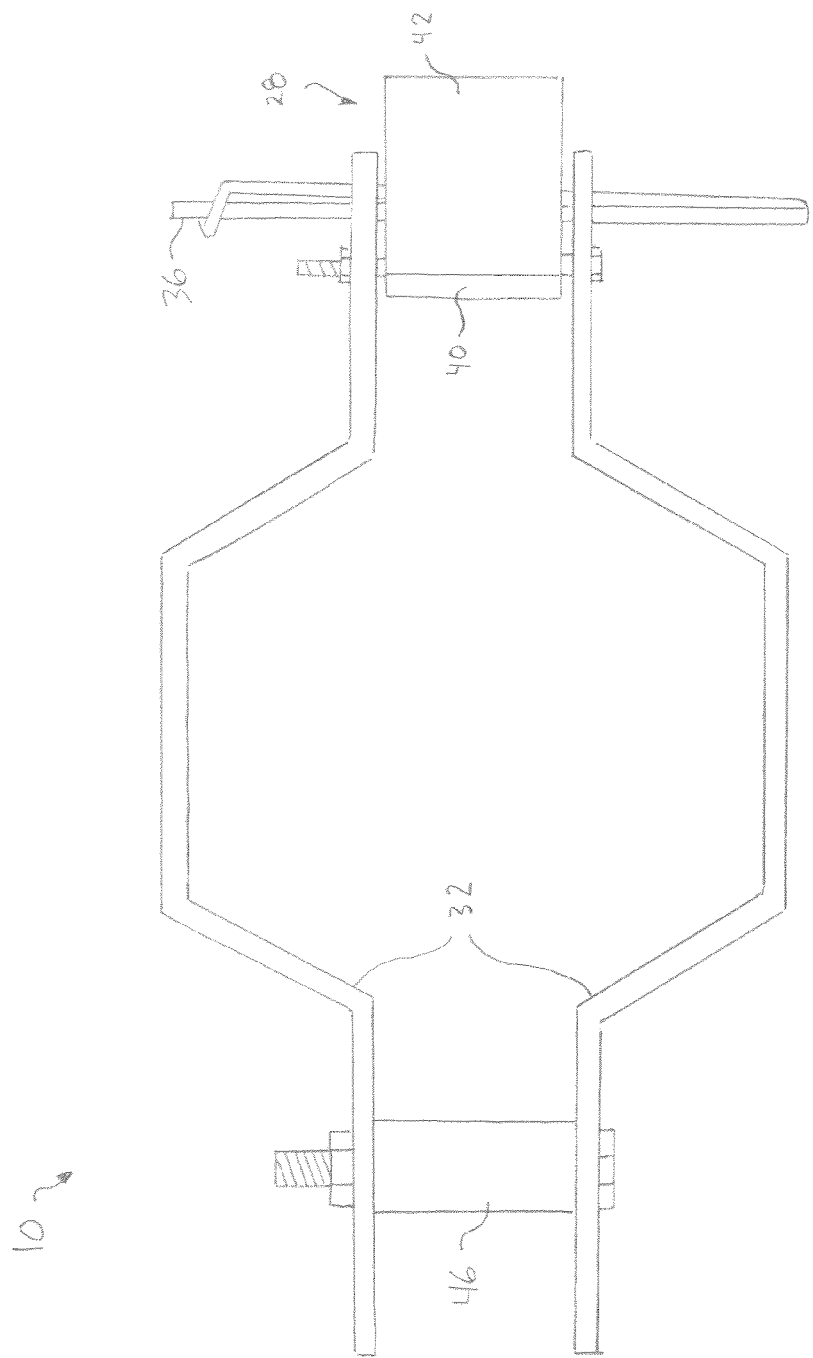

Referring to FIGS. 1a and 1b, an anti-rotation device 10 according to the present invention is shown. The anti-rotation device 10 comprises a two-part bracket 32 that wraps around the housing of a stuffing box. The two parts of the bracket 32 are secured in a spaced apart manner at one end by a spacer 46 which is sized to correspond to the width of a stop member 28, the stop member 28 being located at the opposite end of the bracket 32. The spacer 46 is secured in place by means of a bolt and nuts, which bolt passes through holes 44 in the bracket 32. The bracket 32 is shown in a hexagonal configuration, as many stuffing box housings have a hexagonal cross section, but even if the housing is not hexagonal it will have the same diameter and the illustrated embodiment can be used.

Figure 2B:
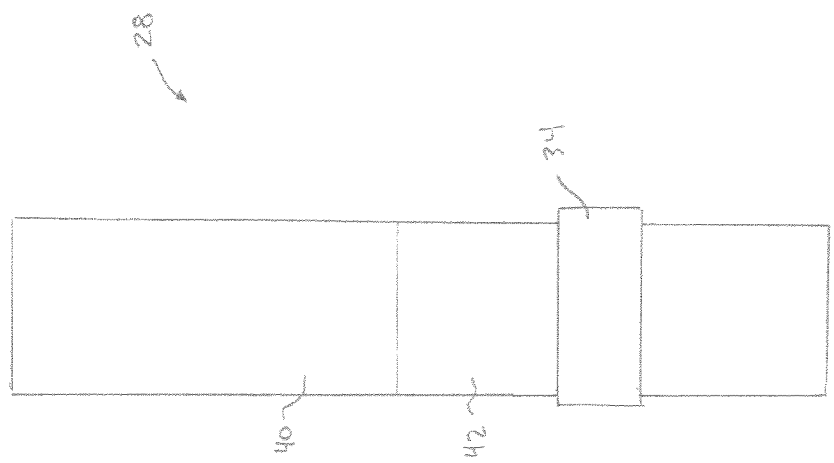
Figure 2A:
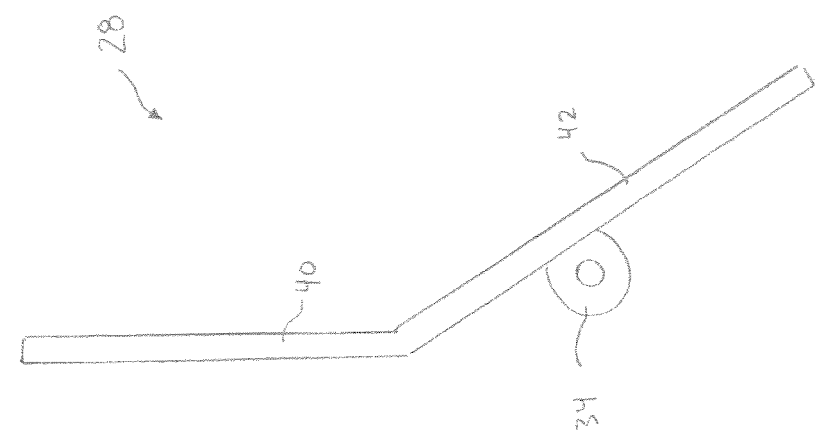

The stop member 28, which is also shown in detail in FIGS. 2a and 2b, comprises an upper end 40 and a lower end 42, the upper end 40 disposed at an angle to the lower end 42. The stop member 28 is mounted on the bracket 32 by pivotable mounting means 34, which in the illustrated embodiment comprises a bolt that passes through a pipe welded to the back of the lower end 42 of the stop member 28. This pivotable mounting means 34 allows the upper end 40 of the stop member 28 to be pivoted away from its engaged position when desired. To prevent pivoting of the stop member 28, the bracket 32 is provided with holes 38 through which a locking mechanism 36 can be inserted, which is explained in detail below.

Figure 3A:
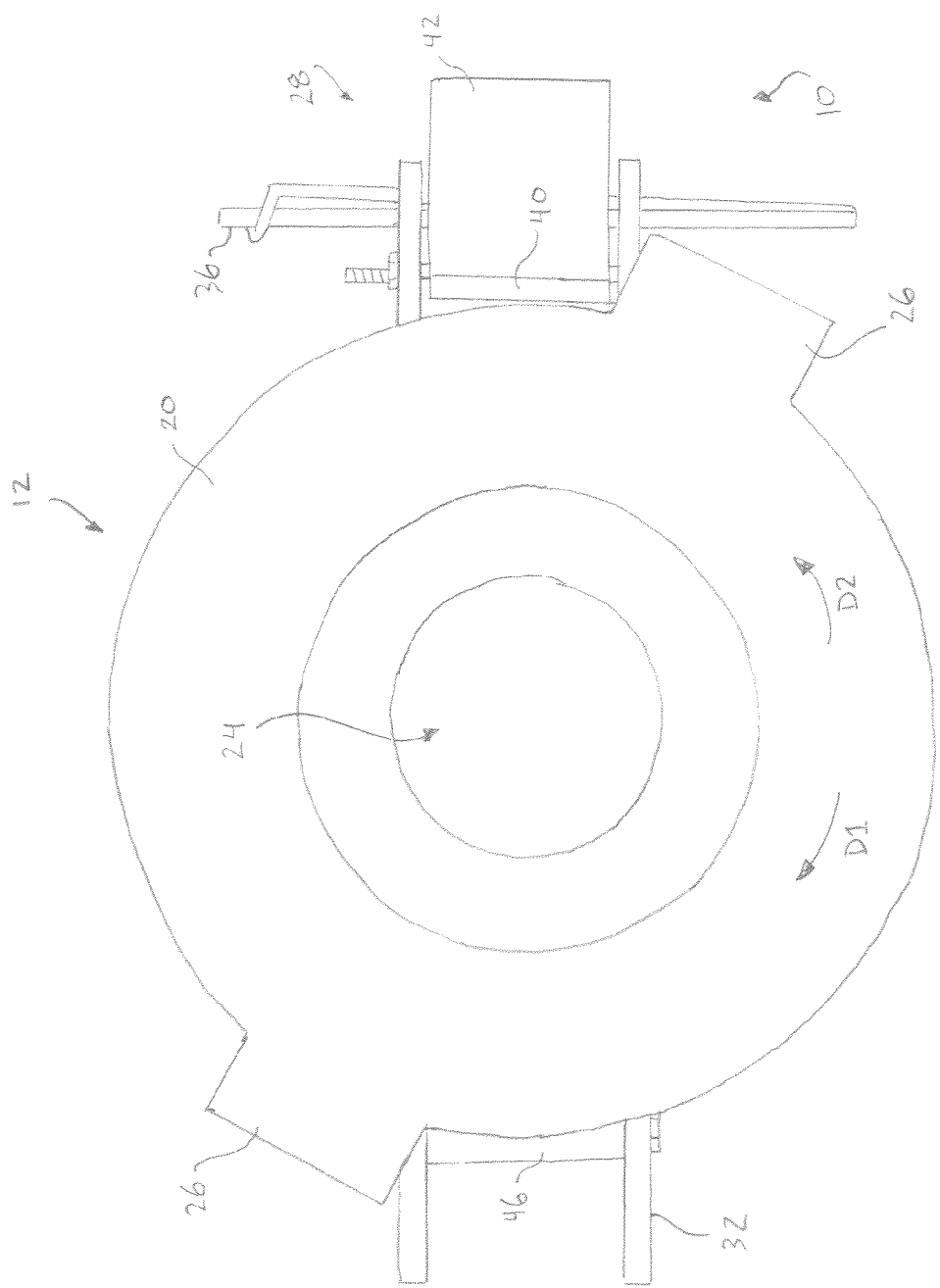
Figure 3B:
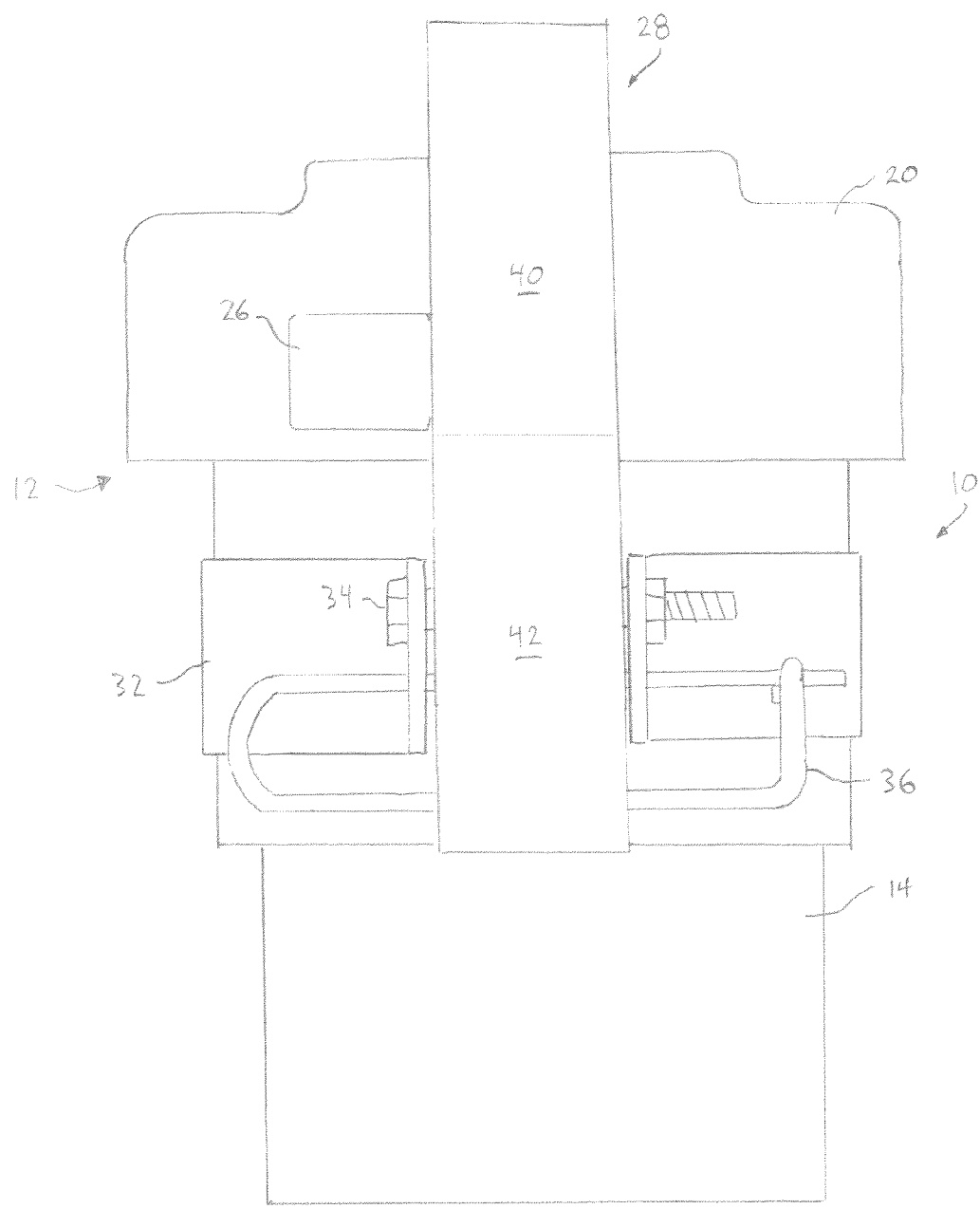

FIGS. 3a and 3b illustrate an anti-rotation device 10 installed on a standard stuffing box 12. The stuffing box 12 comprises a housing 14 and a cap 20, which housing 14 and cap 20 are correspondingly threaded for mating of the parts in a manner well known in the art. As indicated above, the cap 20 is provided with an opening 24 through which a shaft may pass during use of the stuffing box 12. In the standard stuffing box cap 20 illustrated in FIGS. 3a and 3b, the cap 20 comprises two opposed protuberances or lugs 26 which are of unitary construction with the cap 20 and extend outwardly from the outside edge of the cap 20. The anti-rotation device 10 is installed by securing the bracket 32 around the circumference of the housing 14 of the stuffing box 12 by means of the bolts and nuts, as illustrated, with the bracket 32 spaced at opposite ends by the spacer 46 and the stop member 28 and pivotable mounting means 34. The anti-rotation device 10 is provided with a locking mechanism 36, which in the illustrated embodiment is a spring safety pin, although other means for locking the device would be clear to one skilled in the art.

The anti-rotation device 10 is of simple construction and can be fabricated using strap iron, small pipe, bolts, lock nuts, and a pin for a locking mechanism 36. Preferably, the iron used in the manufacture of the anti-rotation device 10 is mild iron of ⅛ inch thickness and 1 inch width; while thicker iron could be used, the width is well-suited for a standard stuffing box housing. Mild steel is advantageous as it is readily available, inexpensive, and easy to weld; other metals such as aluminum or stainless steel could be used, but they would introduce greater expense and are more difficult to weld.

Figure 4A:
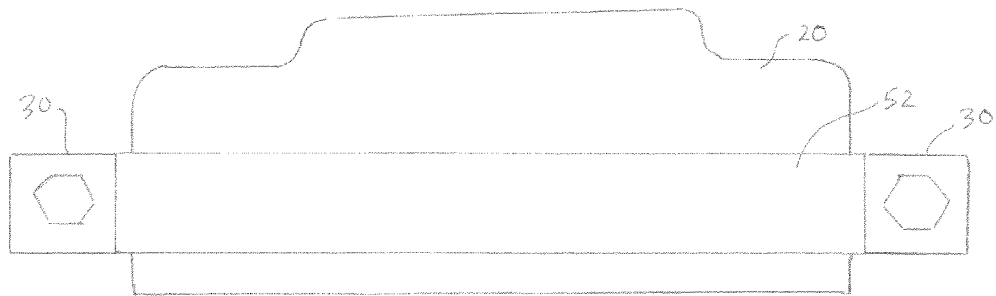
FIG. 4a is an elevation view of a bolt-on protuberance in accordance with an embodiment of the present invention.
Figure 4B:
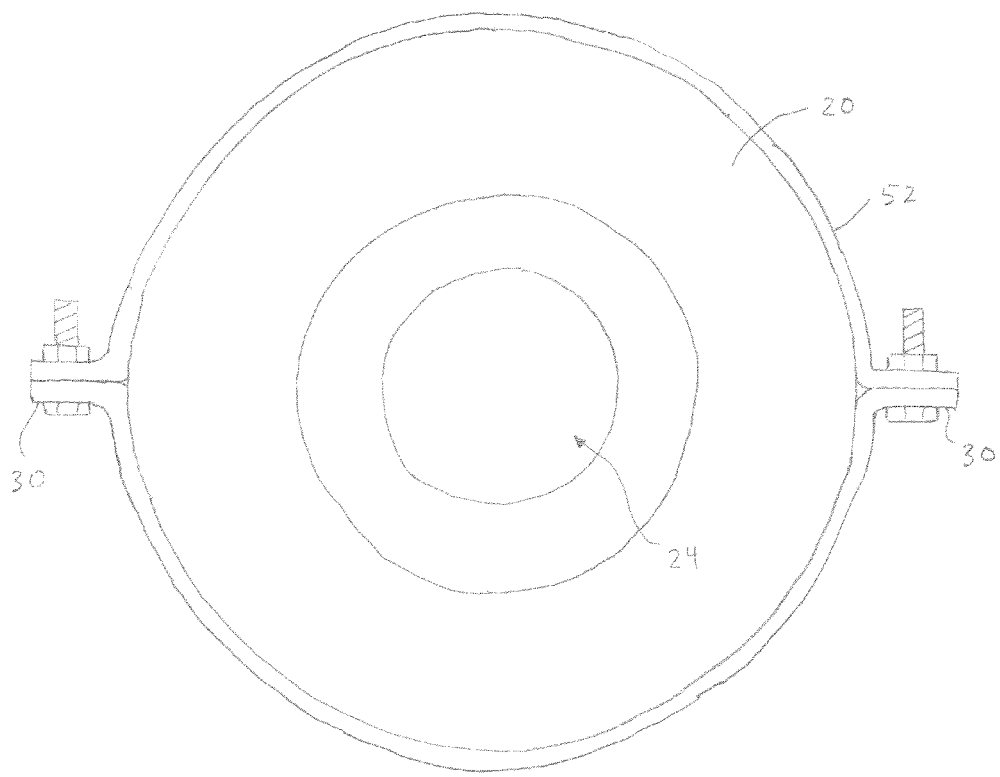

Although the embodiment illustrated in FIGS. 1a to 3b shows a standard stuffing box 12 having protuberances or lugs 26, not all stuffing box caps are provided with such protuberances 26. In that case, the present invention can still be utilized, but some outward extension of the cap 20 needs to be incorporated into the anti-rotation device 10 to enable the prevention of cap 20 rotation. Referring now to FIGS. 4a and 4b, the stuffing box cap 20 has smooth edges, with no protuberances or lugs 26. A two-part cap bracket 52 is accordingly attached to the outside edge of the cap 20 and secured in place by means of bolts and locking nuts. The result is that protuberances 30 now extend outwardly from the circumference of the cap 20 and can engage the stop member 28 during operation, as described below.

In operation, the anti-rotation device 10 is mounted on the housing 14 of the stuffing box 12 as described above and illustrated in FIGS. 3a and 3b. (If necessary, the cap bracket 52 is also mounted on the cap 20 if the cap 20 does not have protuberances 26.) This is preferably undertaken after the cap 20 has been screwed onto the housing 14, so that the bracket 32 can be adjusted to have the stop member 28 abut one of the protuberances 26/30. As shown in FIG. 3a, the cap 20 is designed to rotate through the threaded connection to either tighten (direction D1) or loosen (direction D2), and the present invention is intended to block the cap 20 from rotating in direction D2 once the cap 20 has been tightened. Accordingly, the bracket 32 should be secured in a position such that the stop member 28 abuts the protuberance 26/30 on the side where it would normally move when being loosened in direction D2. To maintain the upper end 40 of the stop member 28 in contact with the protuberance 26/30, the locking mechanism 36 is engaged. If the cap 20 becomes disposed to loosen, the protuberance 26/30 will meet the resistance of the upper end 40 and loosening will be prevented.

As indicated above, it may also be desirable to loosen and even remove the cap, for example to replace worn packing. In that case, the locking mechanism 36 can be disengaged or removed; in the illustrated embodiment, the locking pin would be removed from the holes 38. Once the locking mechanism 36 is no longer operative to restrict pivoting of the stop member 28, the stop member 28 can pivot along the pivotable mounting means 34 such that the upper end 40 of the stop member 28 pivots away from the cap and free of the protuberance 26/30. Once the upper end 40 of the stop member 28 is clear of the protuberance 26/30, the cap 20 can be rotated in direction D2 as desired. When it is desired to once more secure the stuffing box 12, the cap 20 can be re-tightened in direction D1 and the upper end 40 of the stop member 28 pivoted back into place abutting the protuberance 26/30, with the locking mechanism 36 finally re-engaged. In the event that the protuberance 26/30 is no longer properly aligned with the stop member 28, the bracket 32 can be loosened and re-adjusted to shift the upper end 40 of the stop member 28 into abutment with the protuberance 26/30.

As can be readily seen, then, there are numerous advantages provided by the present invention. It can provide effective means for addressing a potentially significant problem in the oil and gas industry, with a device that is easy and inexpensive to construct and simple to use and maintain. It can be applied to new stuffing boxes, or can be employed with existing stuffing boxes already in use in the field.

The foregoing is considered as illustrative only of the principles of the invention. Thus, while certain aspects and embodiments of the disclosure have been described, these have been presented by way of example only and are not intended to limit the scope of the disclosure. For example, the illustrated embodiments show the stop member mounted on a bracket, but the stop member itself could be mounted on the stuffing box housing in a temporary or permanent arrangement. Indeed, the present invention may be embodied in a variety of other forms without departing from the spirit of the invention, which invention is defined solely by the claims below.

The invention claimed is:

1. An anti-rotation device for a stuffing box, the stuffing box comprising a housing with a threaded opening and a correspondingly threaded cap configured to seal the opening, the housing and the cap configured when threadably connected to retain packing in the housing under a pressure above ambient, the cap rotatable in a first direction to seal the opening and in an opposite second direction to unseal the opening, the pressure disposing the cap to rotate in the second direction and unseal the opening, the cap being provided with a protuberance on an outside edge thereof, the anti-rotation device comprising a stop member pivotably attached to the outside of the housing and extending at least adjacent the cap but is unbiased toward the cap, and a disengageable locking mechanism to selectively lock the stop member adjacent the cap, the stop member capable of pivoting away from the cap and the protuberance when unlocked and prevented from pivoting away from the cap and the protuberance when locked, such that upon rotation of the cap in the second direction by operation of the pressure the protuberance contacts the stop member and the cap is thereby prevented from further rotation in the second direction.

2. The anti-rotation device of claim 1 wherein the protuberance is of unitary construction with the cap.

3. The anti-rotation device of claim 1 wherein the protuberance is mounted on the cap.

4. The anti-rotation device of claim 1 wherein the stop member is removably attached to the housing.

5. The anti-rotation device of claim 1 wherein the stop member is attached to the housing by means of a bracket.

6. The anti-rotation device of claim 5 wherein the bracket is removable from the housing.

7. The anti-rotation device of claim 5 wherein the stop member is removable from the bracket.

8. The anti-rotation device of claim 5 wherein the bracket comprises pivotable mounting means for mounting the stop member thereon.

9. The anti-rotation device of claim 8 wherein the pivotable mounting means are provided with a disengageable locking mechanism to prevent pivoting of the stop member away from the cap.

10. The anti-rotation device of claim 1 wherein the stop member is attached to the housing by pivotable mounting means, such that the stop member may be pivoted away from the cap and out of contact with the protuberance.

11. The anti-rotation device of claim 10 wherein the pivotable mounting means are provided with a disengageable locking mechanism to prevent pivoting of the stop member away from the cap.

12. An anti-rotation device for use with a stuffing box, the stuffing box comprising a housing with a threaded opening and a correspondingly threaded cap configured to seal the opening, the housing and the cap configured when threadably connected to retain packing in the housing under a pressure above ambient, the cap rotatable in a first direction to seal the opening and in an opposite second direction to unseal the opening, the pressure disposing the cap to rotate in the second direction and unseal the opening, the cap being provided with a protuberance on an outside edge thereof, the anti-rotation device comprising a stop member pivotably attached to the outside of the housing and for extending at least adjacent to but unbiased toward the cap; and a disengageable locking mechanism to selectively lock the stop member adjacent the cap, the stop member capable of pivoting away from the cap and the protuberance when unlocked and prevented from pivoting away from the cap and the protuberance when locked, such that upon rotation of the cap in the second direction by operation of the pressure the protuberance contacts the stop member and the cap is thereby prevented from further rotation in the second direction.

13. An anti-rotation device for use with a stuffing box, the stuffing box comprising a housing with a threaded opening and a correspondingly threaded cap configured to seal the opening, the housing and the cap configured when threadably connected to retain packing in the housing under a pressure above ambient, the cap rotatable in a first direction to seal the opening and in an opposite second direction to unseal the opening, the pressure disposing the cap to rotate in the second direction and unseal the opening, the anti-rotation device comprising:
  a protuberance for mounting on an outside edge of the cap;
  a stop member pivotably attached to the outside of the housing and for extending at least adjacent the cap; and
  a disengageable locking mechanism to selectively lock the stop member adjacent the cap;
  the stop member capable of pivoting away from the cap and the protuberance when unlocked, and the stop member prevented from pivoting away from the cap and the protuberance when locked;
  wherein, upon rotation of the cap in the second direction by operation of the pressure the protuberance contacts the stop member and the cap is thereby prevented from further rotation in the second direction.

* * * * *